United States Patent
Xiao et al.

(10) Patent No.: US 7,791,225 B2
(45) Date of Patent: Sep. 7, 2010

(54) POWER SWITCHING CIRCUIT AND LIQUID CRYSTAL DISPLAY USING SAME

(75) Inventors: Hua Xiao, Shenzhen (CN); Tong Zhou, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 339 days.

(21) Appl. No.: 11/891,796

(22) Filed: Aug. 13, 2007

(65) Prior Publication Data

US 2008/0037186 A1    Feb. 14, 2008

(30) Foreign Application Priority Data

Aug. 11, 2006    (TW)    ............................... 95129589 A

(51) Int. Cl.
    *H02B 1/24*    (2006.01)
(52) U.S. Cl. .................. 307/113; 307/130; 307/134; 307/139; 307/154
(58) Field of Classification Search ............... 307/130, 307/134, 139, 154, 113; 327/432; 345/52, 345/212
    See application file for complete search history.

(56) References Cited

U.S. PATENT DOCUMENTS

| | | | | |
|---|---|---|---|---|
| 4,398,098 A | * | 8/1983 | Minchey | ............... 307/140 |
| 5,903,260 A | * | 5/1999 | Imamura | ............... 345/211 |
| 5,969,438 A | * | 10/1999 | Odaohara | ............... 307/80 |
| 6,256,182 B1 | | 7/2001 | Suzuki et al. | |
| 6,373,479 B1 | * | 4/2002 | Moon | ............... 345/211 |
| 6,903,734 B2 | | 6/2005 | Eu | |
| 7,015,904 B2 | * | 3/2006 | Kim | ............... 345/212 |
| 7,279,874 B2 | * | 10/2007 | Masuda | ............... 323/282 |
| 2007/0040452 A1 | * | 2/2007 | Chen | ............... 307/134 |

FOREIGN PATENT DOCUMENTS

| | | |
|---|---|---|
| JP | 2001-318565 A | 11/2001 |
| JP | 2004-151514 A | 5/2004 |

* cited by examiner

*Primary Examiner*—Albert W Paladini
*Assistant Examiner*—Hal I Kaplan
(74) *Attorney, Agent, or Firm*—Wei Te Chung

(57) ABSTRACT

An exemplary LCD (2) includes a control signal input terminal (210) configured for receiving a control signal; an output terminal (220) configured to be connected to a load circuit; a first direct current (DC) power supply (230); a first switching transistor (250) including a control electrode "b" connected to the control signal input terminal, a first current conducting electrode "c" connected to the DC power supply via a first bias resistor, and a second current conducting electrode "e" connected to ground; a second switching transistor (250) including a control electrode "G" connected to the first current conducting electrode of the first switching transistor, a first current conducting electrode "S" connected to the DC power supply, and a second current conducting electrode "D" connected to the output terminal; and a discharging resistor (225) configured to be connected between the output terminal and ground.

18 Claims, 2 Drawing Sheets

POWER SWITCHING CIRCUIT AND LIQUID CRYSTAL DISPLAY USING SAME

FIELD OF THE INVENTION

The present invention relates to power switching circuits and liquid crystal displays (LCDs) using power switching circuits, and particularly to a power switching circuit employing one direct current (DC) power supply.

GENERAL BACKGROUND

An LCD has the advantages of portability, low power consumption, and low radiation, and has been widely used in various portable information products such as notebooks, personal digital assistants (PDAs), video cameras and the like. Furthermore, the LCD is considered by many to have the potential to completely replace CRT (cathode ray tube) monitors and televisions.

A typical LCD includes an LCD panel. The LCD panel includes a multiplicity of pixels. Each pixel has a capacitance. A power supply provides an operation voltage to the LCD. When the power supply is turned off, the operation voltage does not immediately decrease. For example, when the operation voltage is 5V and the power supply is turned off, a decrease from the operation voltage to a residual voltage of 0.4V takes about 20 seconds. If the power supply is turned on again quickly before the residual voltage in the power supply has decreased to a predetermined threshold voltage, an operational error may occur in the LCD. To prevent such operational error, a power switching circuit is provided in the LCD to remove the residual voltage.

FIG. 2 is a diagram of a typical power switching circuit 10 used in an LCD. The power switching circuit 10 includes a control signal input terminal 110 configured for receiving control signals, an output terminal 120 connected to an LCD panel of the LCD, a twelve volt direct current (DC) power supply 130, a five volt DC power supply 140 functioning as a main power source of the LCD, a first negative-positive-negative (NPN) transistor 150, a second NPN transistor 170, an n-channel enhancement mode metal-oxide-semiconductor (NMOS) transistor 160, a first resistor 155, a second resistor 156, a third resistor 165, a fourth resistor 175, and a fifth resistor 176.

The first NPN transistor 150 includes a base electrode "b" connected to the control signal input terminal 110 via the first resistor 155, an emitter electrode "e" connected to the base electrode "b" via the second resistor 156, and a collector electrode "c" connected to the 12V DC power supply 130 via the third resistor 165. The emitter electrode "e" of the NPN transistor 150 is also connected to ground.

The second NPN transistor 170 includes a base electrode "b" connected to the control signal input terminal 110 via the fourth resistor 175, an emitter electrode "e" connected to ground, and a collector electrode "c" connected to the output terminal 120 via the fifth resistor 176.

The NMOS transistor 160 includes a gate electrode "G" connected to the collector electrode "c" of the first NPN transistor 150, a source electrode "S" connected to the output terminal 120, and a drain electrode "D" connected to the 5V DC power supply 140.

In order to apply a 5V voltage from the 5V DC power supply 140 to the output terminal 120, a first control signal such as a low level 0V voltage is provided to the control signal input terminal 110 by an external circuit (not shown). Thus the first NPN transistor 150 and the second NPN transistor 170 are switched off. A 12V voltage from the 12V DC power supply 130 is applied to the gate electrode "G" of the NMOS transistor 160 via the third resistor 165. Thus the NMOS transistor 160 is switched on, and the 5V voltage from the 5V DC power supply 140 is applied to the output terminal 120 via the activated NMOS transistor 160.

In order to suspend the supply of the 5V voltage from the 5V DC power supply 140 to the output terminal 120, a second control signal such as a high level 5V voltage is provided to the control signal input terminal 110 by the external circuit. Thus the first NPN transistor 150 and the second NPN transistor 170 are switched on. The gate electrode "G" of the NMOS transistor 160 is connected to ground via the activated first NPN transistor 150, so that the NMOS transistor 160 is switched off. Thus, the 5V voltage from the 5V DC power supply 140 cannot be provided to the output terminal 120. Electric charge stored in an LCD (not shown) which is connected to the output terminal 120 can be discharged to ground quickly through the actived second NPN transistor 170.

Because the power switching circuit 10 includes the three transistors 150, 160, 170, the power switching circuit 10 is rather complicated and costly.

It is desired to provide a new power switching circuit used in an LCD which can overcome the above-described deficiencies.

SUMMARY

In one preferred embodiment, a power switching circuit includes a control signal input terminal configured for receiving a control signal; an output terminal configured to be connected to a load circuit; a first direct current (DC) power supply; a first switching transistor including a control electrode connected to the control signal input terminal, a first current conducting electrode connected to the DC power supply via a first bias resistor, and a second current conducting electrode connected to ground; a second switching transistor including a control electrode connected to the first current conducting electrode of the first switching transistor, a first current conducting electrode connected to the DC power supply, and a second current conducting electrode connected to the output terminal; and a discharging resistor configured to be connected between the output terminal and ground.

Other novel features and advantages will become more apparent from the following detailed description when taken in conjunction with the accompanying drawings.

DETAILED DESCRIPTION OF PREFERRED EMBODIMENTS

Reference will now be made to the drawings to describe the present invention in detail.

Figure 1:
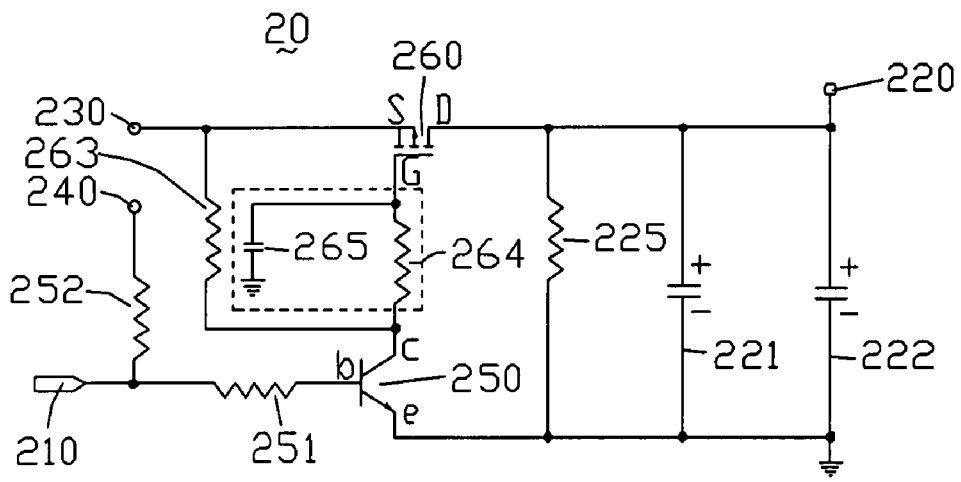
FIG. 1 is a diagram of a power switching circuit according to an exemplary embodiment of the present invention, the power switching circuit being typically used in an LCD.
Figure 2:
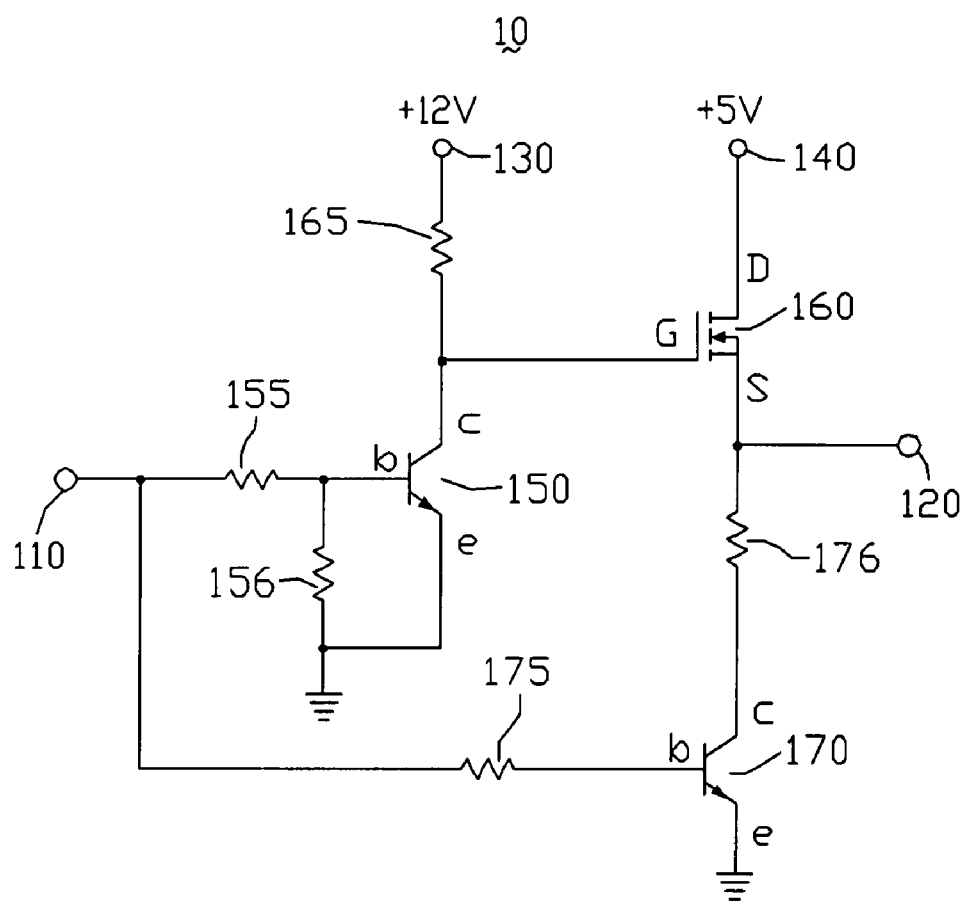
FIG. 2 is a diagram of a conventional power switching circuit used in an LCD.

Referring to FIG. 1, a power switching circuit 20 according to an exemplary embodiment of the present invention is shown. The power switching circuit 20 is typically used in an LCD. The LCD includes an LCD panel. The power switching circuit 20 includes a control signal input terminal 210 configured for receiving a control signal, an output terminal 220 configured for connecting to a load circuit (not shown) such as the LCD panel, a 5V DC power supply 230 functioning as a main power source of the load circuit, a 3.3V DC power supply 240, an NPN bipolar transistor 250, a p-channel enhancement mode metal-oxide-semiconductor (PMOS) transistor 260, a current limiting resistor 251, a first bias resistor 252, a second bias resistor 263, a charging resistor 264, a discharging resistor 225, a charging capacitor 265, a first filter capacitor 221, and a second filter capacitor 222.

The NPN bipolar transistor 250 includes a base electrode "b" connected to the control signal input terminal 210 via the current limiting resistor 251, an emitter electrode "e" connected to ground, and a collector electrode "c" connected to the DC power supply 230 via the second bias resistor 263.

The control signal input terminal 210 is connected to the DC power supply 240 via the first bias resistor 252.

The PMOS transistor 260 includes a gate electrode "G" connected to the collector electrode "c" of the NPN bipolar transistor 250 via the charging resistor 264, a source electrode "S" connected to the DC power supply 230, and a drain electrode "D" connected to the output terminal 220. The gate electrode "G" of the PMOS transistor 260 is also connected to ground via the charging capacitor 265.

The output terminal 220 is connected to ground via the discharging resistor 225, the first filter capacitor 221, and the second filter capacitor 222 in parallel.

In order to apply the 5V voltage from the DC power supply 230 to the output terminal 220, a first control signal such as a high level 5V voltage is provided to the control signal input terminal 210 by an external circuit (not shown). Therefore the NPN bipolar transistor 250 is switched on. Thus electric charge stored in the charging capacitor 265 is discharged to ground via the charging resistor 264 and the activated NPN bipolar transistor 250 in series. Thereby, a potential of the gate electrode "G" of the PMOS transistor 260 changes from 5V to 0V. A voltage difference between the gate electrode "G" and the source electrode "S" of the PMOS transistor 260 is approximately equal to −5V, thus the PMOS transistor 260 is switched on. Accordingly, the 5V voltage from the DC power supply 230 is provided to the output terminal 220 via the activated PMOS transistor 260. The charging resistor 264 and the charging capacitor 265 can prevent the PMOS transistor 260 from being switched on too quickly. Thus a rush of current in the load circuit can be reduced or even eliminated, the rush of current ordinarily being generated when a 5V voltage from a five volt DC power supply 230 is applied to the output terminal 220.

In order to suspend the supply of the 5V voltage from the DC power supply 230 to the output terminal 220, a second control signal such as a low level 0V voltage is provided to the control signal input terminal 210 by the external circuit. Therefore the NPN bipolar transistor 250 is switched off. Thus the 5V DC power supply 230 quickly charges the charging capacitor 265 to 5V via the second bias resistor 263 and the charging resistor 264 in series. A voltage difference between the gate electrode "G" and the source electrode "S" of the PMOS transistor 260 is approximately equal to 0V, therefore the PMOS transistor 260 is switched off. Thus, the 5V voltage from the DC power supply 230 cannot be provided to the output terminal 220. Electric charge stored in the load circuit connected to the output terminal 220 can be quickly discharged to ground through the discharging resistor 225.

Because the power switching circuit 20 includes only the two transistors 250, 260, the power switching circuit 20 is relatively simple and inexpensive. Furthermore, the power switching circuit 20 includes the charging resistor 264 and the charging capacitor 265. Thus a rush of current in the load circuit can be reduced or even eliminated, the rush of current ordinarily being generated when a 5V voltage from the five volt DC power supply 230 is applied to the output terminal 220.

Figure 3:
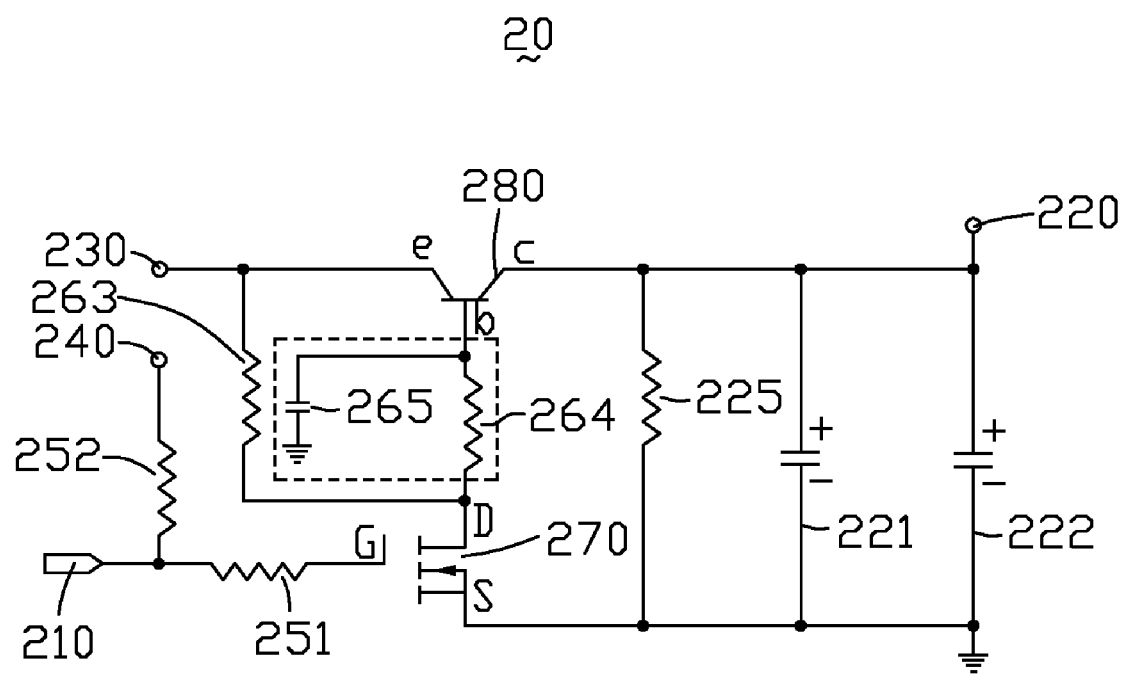
FIG. 3 is a diagram of a power switching circuit according to another exemplary embodiment of the present invention, the power switching circuit being typically used in an LCD.

Referring to FIG. 3, in another embodiment, the NPN bipolar transistor 250 in the foregoing embodiment can be replaced by an NMOS transistor 270, and the PMOS transistor 260 can be replaced by a positive-negative-positive (PNP) transistor 280.

It is to be further understood that even though numerous characteristics and advantages of preferred and exemplary embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. A power switching circuit comprising:
    a control signal input terminal configured for receiving a control signal;
    an output terminal configured to be connected to a load circuit;
    a first direct current (DC) power supply;
    a first switching transistor comprising a control electrode connected to the control signal input terminal, a first current conducting electrode connected to the DC power supply via a bias resistor, and a second current conducting electrode configured to be connected to ground;
    a second switching transistor comprising a control electrode connected to the first current conducting electrode of the first switching transistor, a first current conducting electrode connected to the DC power supply, and a second current conducting electrode connected to the output terminal;
    a charging resistor connected between the first current conducting electrode of the first switching transistor and the control electrode of the second switching transistor;
    a charging capacitor connected between the control electrode of the second switching transistor and ground; and
    a discharging resistor configured to be connected between the output terminal and ground.

2. The power switching circuit as claimed in claim 1, further comprising a current limiting resistor connected between the control electrode of the first switching transistor and the control signal input terminal.

3. The power switching circuit as claimed in claim 2, further comprising a second DC power supply and another bias resistor, wherein the control signal input terminal is connected to the second DC power supply via the another bias resistor.

4. The power switching circuit as claimed in claim 3, wherein the second DC power supply is a 3.3 volt DC power supply.

5. The power switching circuit as claimed in claim 1, wherein the first switching transistor is a negative-positive-negative (NPN) transistor.

6. The power switching circuit as claimed in claim 1, wherein the first switching transistor is an n-channel enhancement mode metal-oxide-semiconductor (NMOS) transistor.

7. The power switching circuit as claimed in claim 1, wherein the second switching transistor is a p-channel enhancement mode metal-oxide-semiconductor (PMOS) transistor.

8. The power switching circuit as claimed in claim 1, wherein the second switching transistor is a positive-negative-positive (PNP) transistor.

9. The power switching circuit as claimed in claim 1, wherein the first DC power supply is a five volt DC power supply.

10. The power switching circuit as claimed in claim 1, wherein the load circuit is comprised in a liquid crystal display.

11. The power switching circuit as claimed in claim 1, further comprising a filter capacitor configured to be connected between the output terminal and ground.

12. A liquid crystal display (LCD) comprising:
an LCD panel;
a control signal input terminal configured for receiving a control signal;
an output terminal connected to the LCD panel;
a first direct current (DC) power supply;
a first switching transistor comprising a control electrode connected to the control signal input terminal, a first current conducting electrode connected to the DC power supply via a bias resistor, and a second current conducting electrode connected to ground;
a second switching transistor comprising a control electrode connected to the first current conducting electrode of the first switching transistor, a first current conducting electrode connected to the DC power supply, and a second current conducting electrode connected to the output terminal;
a charging resistor connected between the first current conducting electrode of the first switching transistor and the control electrode of the second switching transistor;
a charging capacitor connected between the control electrode of the second switching transistor and ground; and
a discharging resistor connected between the output terminal and ground.

13. The LCD as claimed in claim 12, further comprising a current limiting resistor connected between the control electrode of the first switching transistor and the control signal input terminal.

14. The LCD as claimed in claim 13, further comprising a second DC power supply and another bias resistor, wherein the control signal input terminal is connected to the second DC power supply via the another bias resistor.

15. The LCD as claimed in claim 14, wherein the second DC power supply is a 3.3 volt DC power supply.

16. The LCD as claimed in claim 12, wherein the first DC power supply is a five volt DC power supply.

17. The LCD as claimed in claim 12, wherein the first switching transistor is a negative-positive-negative (NPN) transistor or an n-channel enhancement mode metal-oxide-semiconductor (NMOS) transistor.

18. The LCD as claimed in claim 12, wherein the second switching transistor is a p-channel enhancement mode metal-oxide-semiconductor (PMOS) transistor or a positive-negative-positive (PNP) transistor.

* * * * *